US006476360B1

(12) United States Patent
Huggler et al.

(10) Patent No.: US 6,476,360 B1
(45) Date of Patent: Nov. 5, 2002

(54) SHELL STRUCTURE FOR A HEATING APPLIANCE, AND METHOD OF MANUFACTURING HEATING APPLIANCE INCLUDING SAME

(75) Inventors: Peter Huggler, Columbia, MO (US); Leon Gurevich, Grover, MO (US)

(73) Assignee: Salton, Inc., Mount Prospect, IL (US)

( * ) Notice: Subject to any disclaimer, the term of this patent is extended or adjusted under 35 U.S.C. 154(b) by 0 days.

(21) Appl. No.: 09/307,302

(22) Filed: May 7, 1999

(51) Int. Cl.[7] .................................................. A47J 37/08
(52) U.S. Cl. ........................ 219/386; 219/521; 219/406; 99/385; 99/391; 99/401
(58) Field of Search ................................. 219/385, 386, 219/395, 402, 406, 521, 526, 537; 99/385, 389, 401, 391–393

(56) References Cited

U.S. PATENT DOCUMENTS

| | | | | |
|---|---|---|---|---|
| 2,778,912 A | * | 1/1957 | Palmer et al. | 219/521 |
| 3,530,279 A | * | 9/1970 | Ottinger | 219/521 |
| 3,558,855 A | * | 1/1971 | Stanek et al. | 219/385 |
| 4,216,372 A | * | 8/1980 | Huggler | 219/521 |
| 4,745,855 A | * | 5/1988 | Younger | 99/391 |
| 5,170,039 A | * | 12/1992 | Eisenberg | 219/386 |
| 5,924,355 A | * | 7/1999 | Belknap et al. | 99/389 |

* cited by examiner

Primary Examiner—Joseph Pelham
(74) Attorney, Agent, or Firm—Dorsey & Whitney LLP

(57) ABSTRACT

A unitary shell for a heating appliance is formed having first and second side panels and first and second end panels. The first end panel has first and second sub panels, each sub panel having a vertical edge and the vertical edges of the first and second sub panels being spaced apart to form an opening between the vertical edges. The first end panel allows the insertion of components through the opening during assembly of the heating appliance. An assembly for a heating appliance may also be formed including the unitary shell and a first heating element attached on the inside of the first side panel. A second heating element is attached on the inside of the second side panel. Each heating element includes at least one terminal adapted to receive a power signal and operates responsive to power being applied to the terminal to generate heat. Furthermore, a method of manufacturing an assembly for a toaster includes providing a shell having first and second side panels and first and second end panels. The first end panel has an opening. A first outer heating element is inserted through the opening and attached to the first side panel. A second outer heating element is inserted through the opening and attached to the second side panel. A center heating element is inserted through the opening and attached to the second end panel.

51 Claims, 8 Drawing Sheets

SHELL STRUCTURE FOR A HEATING APPLIANCE, AND METHOD OF MANUFACTURING HEATING APPLIANCE INCLUDING SAME

TECHNICAL FIELD

The present invention relates generally to heating appliances such as toasters or toaster ovens, and more specifically to a shell structure for a heating appliance that includes an open end panel through which components may be inserted during assembly of the heating appliance.

BACKGROUND OF THE INVENTION

A conventional heating appliance, such as a toaster or toaster oven, generally includes a shell formed from three separate panels. a bottom panel and two end panels. During manufacture of the toaster, these panels, along with a plurality of electrical and mechanical components, are assembled to construct the toaster. FIG. 1 is an isometric view of a conventional toaster 200 with its external case (not shown) removed to illustrate a shell 202. The toaster 200 is described merely as an example of a conventional toaster, and other similar prior art configurations will be understood by those skilled in the art. The shell 202 is formed from a bottom panel 204, a rear end panel 206 and a front end panel 208. Each end panel 206, 208 is attached to the bottom panel 204 through tabs (not shown) that are inserted in respective slots 210, 212 in the bottom panel, as shown for the end panel 208. A first outer heating element 214 and second outer heating element 216 are mounted between the end panels 206, 208, each heating element generating heat to toast food items during operation of the toaster. The heating elements 214, 216 include respective first terminals 217, 219 extending through corresponding apertures in the front end panel 208 and also typically includes a second terminal (not shown) extending through a corresponding aperture (not shown) in the rear end panel 206. Each of the electrical terminals is adapted to receive a respective power signal that is applied to circuitry (not shown) on the heating element 214, 216 to generate heat for toasting food items. To provide added mechanical support for the heating elements 214, 216, a stringer (not shown) is typically attached between the end panels 206, 208 along the top edge of each heating element. A center heating element 218 is positioned between the outer heating elements 214, 216, and generates heat to toast respective food items between the element 218 and the outer heating elements 214, 216. The center heating element 218 also typically includes a terminal 221 extending through an aperture in the front end panel 208 and a terminal (not shown) extending through an aperture (not shown) in the rear end panel 206. None of the electrical terminals 217, 219, 221 contact the front panel 208.

The toaster 200 further includes an outer bread guard 220 positioned inside the end panel 214, and an identical outer bread guard 222 positioned inside the side panel 216. Two inner bread guards 224 and 226 are positioned on both sides of the center heating element 218. Each of the bread guards 220–226 includes a horizontal member 228 and vertical members 230, as shown for the bread guard 220. A first bread cavity 232 is defined between the bread guards 220 and 224, and a second bread cavity 234 is defined between the bread guards 222 and 226. The bread guards 216–222 function to protect bread placed between the bread guards from the heating elements 214–218 during operation of the toaster 200.

A first bread tray (not shown) is contained within the first bread cavity 232 and functions to support a piece of bread as it is lowered into and raised from the bread cavity. A second bread tray (not shown) is similarly positioned within the second bread cavity 234 to support another piece of bread in that bread cavity. Each of the bread trays includes a lever 234 extending through slots 224 and 226, respectively, in the front end panel 208. The levers 234 are pushed down to lower the respective pieces of bread on the bread trays into the bread cavities 232, 234. As the bread trays are pushed down, the outer bread guards 220, 222 move toward the center of the corresponding bread cavity 232, 234, as shown for the bread guard 222. In this way, the bread guards 220–226 position the bread towards the centers of the bread cavities 232 and 234 so that the bread placed on the bread trays is positioned for optimum toasting. The toaster 200 further includes an electronic circuit 236 mounted on the bottom panel 204. Although not shown in FIG. 1, the circuit 236 is typically coupled to the terminals 217–221 and other components of the toaster 200 to control its operation.

During manufacture of the toaster 200, the heating elements 214, 216, and 218, bread guards 220–226, and a plurality of other electrical and mechanical components must be assembled. It is desirable to automate as much of the manufacturing process as possible in order to reduce the cost and increase the reliability of the toaster 200. With the conventional shell 202, however, automating the assembly process is difficult due, in part, to the order in which components must be assembled. For example, as previously described the heating elements 214–218 include respective terminals 217–221 that extend through apertures in the end panels 206, 208. As a result, to position the heating elements 214–218 between the panels 206, 208, one end panel is typically mounted to the bottom panel 204 and then the terminals inserted in the corresponding apertures in that end panel. The terminals at the opposite ends of the elements 214–218 are thereafter inserted in the corresponding apertures in the other end panel 206, 208 and this panel is attached to the bottom panel 204. As will be understood by those skilled in the art, this process is difficult to automate.

In addition to difficulties presented in automating manufacture, the conventional shell 202 is not very sturdy once assembled. This is due primarily to the end panels 206, 208 being fastened to the bottom panel 204 through tabs located at one end. While the end panels 206, 208 could be fastened more securely to the bottom panel 204 to make the shell 202 more sturdy, such as by welding the end panels to the bottom panel, this would increase the cost of manufacturing the toaster 200. Another difficulty presented by the conventional shell 202 is the positioning of the heating elements 214, 216 near the ends of the end panels 206, 208. When the heating elements 214, 216 become hot during operation, a significant amount of heat may be radiated outward away from the cavities 232, 234. This outward radiated heat may heat an external case (not shown) enclosing the shell 202 to an unacceptably high temperature. It is desirable for the external case to have "cool touch" sides, meaning that the sides of the case remain cool even during operation. A panel (not shown) may be placed between the heating elements 214, 216 and the external case, but this requires additional labor and parts, which increase the cost of the toaster 200.

There is a need for a shell structure for a heating appliance that is relatively sturdy, enables automated assembly of the toaster, and enables cool-touch sides to be easily constructed.

SUMMARY OF THE INVENTION

According to one aspect of the present invention, a shell for a heating appliance includes first and second side panels and front and rear end panels. The front end panel has first and second sub panels and each sub panel has a vertical edge. The vertical edges of the first and second sub panels are spaced apart to form an opening between the vertical edges that allows the insertion of components through the opening during assembly of the heating appliance. Each sub panel includes an aperture extending to the corresponding vertical edge. The aperture is adapted to receive a portion of one of the components that extends beyond an outer surface of the sub panel. Each side panel may include a mounting panel formed at a bottom edge of the side panel, the mounting panel being adapted to receive a portion of one of the components.

According to another aspect of the present invention, a first side heating element is attached on the inside of the first side panel and includes a terminal extending through the aperture in the first sub panel. A second side heating element is attached on the inside of the second side panel and includes a terminal extending through the aperture in the second sub panel. A center heating element is attached to the second end panel between the first and second side heat elements. The center heating element includes a terminal extending through an aperture in the second end panel. Each of the first and second side heating elements and the center heating element operates responsive to a power signal being applied on the corresponding terminal to generate heat.

According to a further aspect of the present invention, a method of manufacturing a toaster includes providing a shell having first and second side panels and first and second end panels. The first end panel has an opening. A first outer heating element is inserted through the opening and attached to the first side panel. A second outer heating element is inserted through the opening and attached to the second side panel. A center heating element is inserted through the opening and attached to the second end panel. Outer bread guards may also be inserted through the opening, each outer bread guard being attached adjacent a corresponding outer heating element.

According to a further aspect of the present invention, a unitary shell structure for a heating appliance includes first/and second side panels, a rear end panel, and first and second front end panels. All of the panels are integrally formed from a single piece of material, such as, for example, metal. Each of the first and second front end panels has a vertical edge, the vertical edges of the first and second front end panels being spaced apart to form an opening between the vertical edges that allows the insertion of components through the opening during assembly of the heating appliance. Each of the first and second front end panels includes an aperture extending to the corresponding vertical edge, the aperture being adapted to receive a portion of one of the components that extends beyond an outer surface of the front end panel.

DETAILED DESCRIPTION OF THE INVENTION

Figure 2:
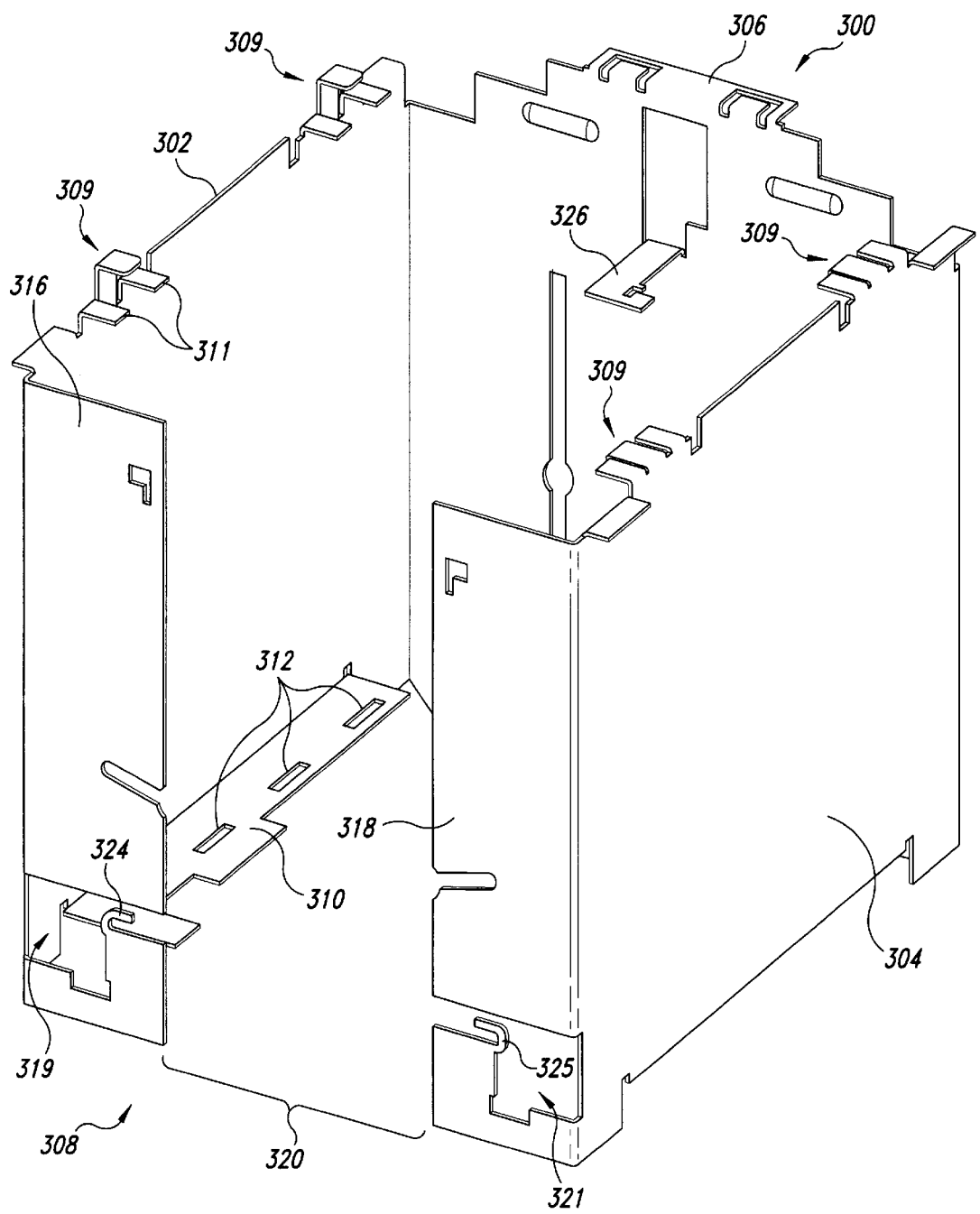
FIG. 2 is an isometric view of a toaster shell according to one embodiment of the present invention.

FIG. 2 is an isometric view of a toaster shell 300 according to one embodiment of the present invention. In the embodiment of FIG. 2, the shell 300 is a unitary shell including two side panels 302, 304, a rear panel 306, and a front panel 308. The side panels 302, 304 each include a pair of upper side tabs 309 with spacers 311 being formed on both sides of each side tab. The tabs 309 function to secure a heating element (not shown) to the corresponding side panel 302, 304, as will be described in more detail below. In FIG. 2, the upper side tabs 309 of the side panel 302 are shown before being bent down to secure the corresponding heating element in place, while the tabs 309 of the side panel 304 are shown after having been bent down to secure the corresponding heating element. Each of the side panels 302 and 304 further includes a horizontal panel 310 formed along its bottom edge. Each horizontal panel 310 includes a plurality of slots 312, each slot adapted to receive a tab from a corresponding heating element (not shown). In addition to receiving tabs from the corresponding heating element, each horizontal panel 310 also increases the strength of the corresponding side panel 302, 304.

In the shell 300, the front panel 308 includes a left sub panel 316 and right sub panel 318. An opening 320 is formed between vertical edges of the sub panels 316, 318 to allow heating elements and other components to be inserted inside the shell 300 during construction of the toaster, as will be explained in more detail below. Each of the sub panels 316, 318 includes a respective aperture 319, 321 that extends to the vertical edge of the sub panel. The apertures 319, 321 receive a terminal of a heating element being secured to the adjoining side panel 302, 304. A hook 324, 325 formed adjoining the apertures 319, 321 receives a portion of a bread guard (not shown) during construction of the toaster, as will be described in more detail below. The rear panel 306 of the shell 300 includes an upper rear tab 326 and lower rear tab 328 (not shown in FIG. 2) to which a center heating element (not shown) is attached during construction of the toaster, as will also be described in more detail below.

Figure 1:
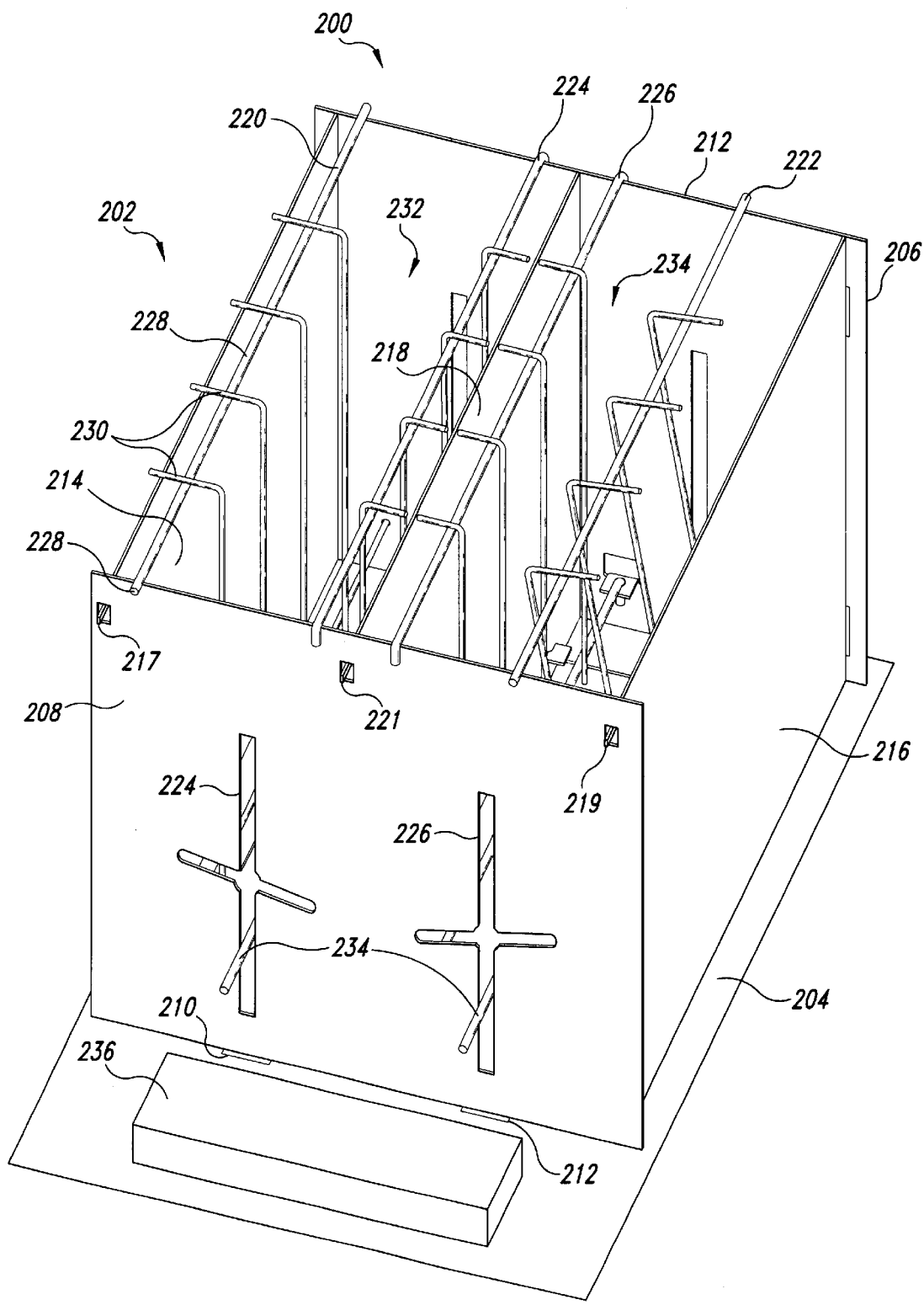
FIGS. 1 is an isometric view of a conventional toaster including a conventional toaster shell.
Figure 3:
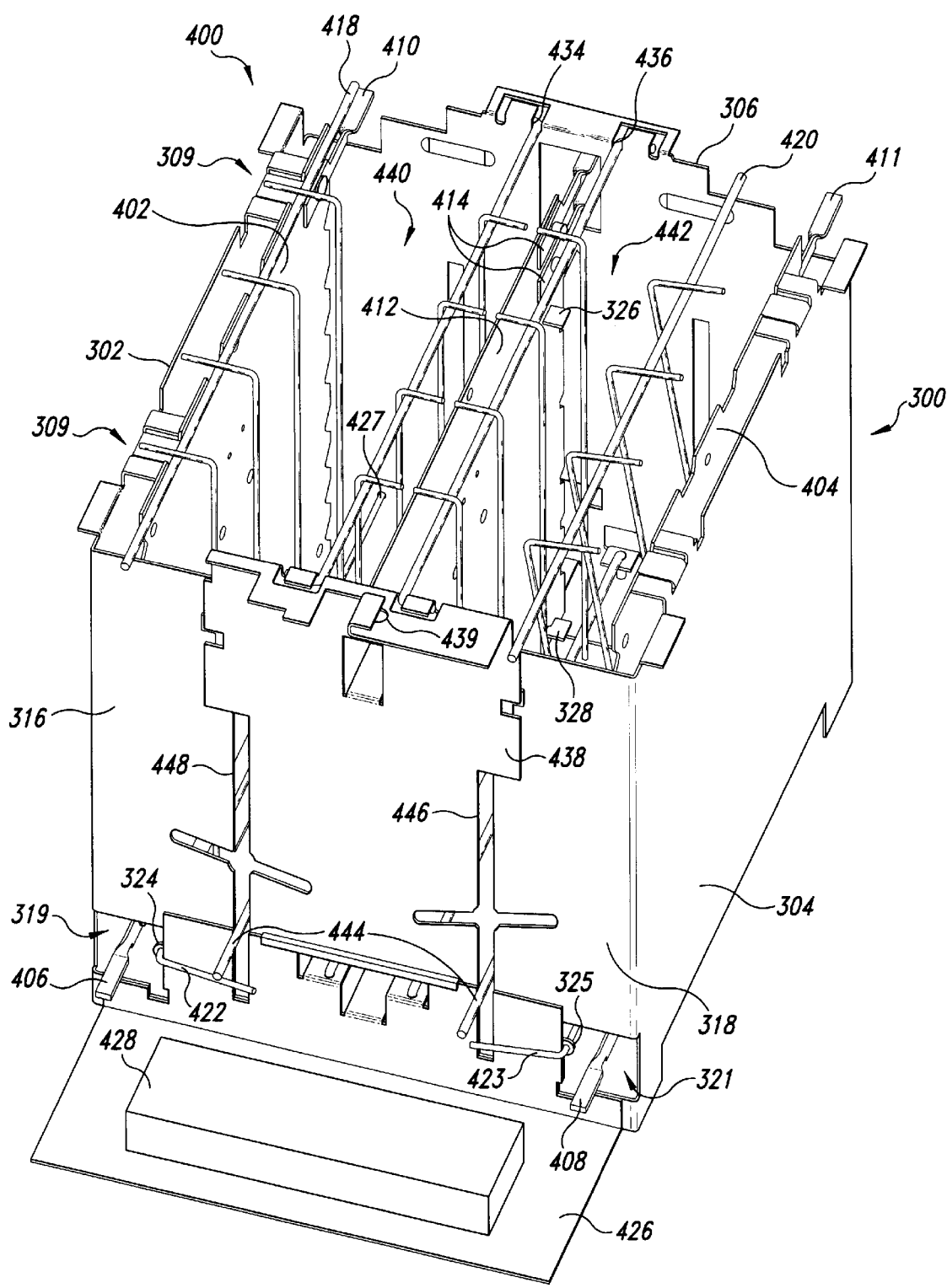
FIG. 3 is an isometric view of a toaster including the toaster shell of FIG. 2 according to one embodiment of the present invention.

FIG. 3 is an isometric view of one embodiment of a toaster 400 with its external housing (not shown) removed to better illustrate the shell 300 along with a plurality of components mounted in the shell. In the toaster 400, many of the components perform the same function as corresponding components previously described with reference to the conventional toaster 200 of FIG. 1, and thus, for the sake of brevity, the function of these components will not be described in more detail. The toaster 400 includes first and second outer heating elements 402, 404 positioned inside the side panels 302 and 304, respectively. To secure the heating element 402, 404 to the corresponding side panel 302, 304, respectively, tabs along the bottom edge of the heating element are inserted in the slots 312 of the horizontal panel 310 and the upper side tabs 309 are thereafter bent down to secure the heating element in place, as will be described in more detail below. The outer heating elements 402, 404 include respective first electrical terminals 406, 408 extending through the apertures 319, 321 in the front sub panels 316, 318, and respective second electrical terminals 410, 411 extending above a top edge of the rear panel 306.

The toaster 400 includes an outer bread guard 418 positioned inside the outer heating element 402, and a similar outer bread guard 420 positioned inside the outer heating element 404. The outer bread guard 418 includes a bottom member 422 having a front end that extends through the hook 324 and a rear end that extends through a hole 427 in the rear panel 306 to thereby position the outer bread guard 418 in place. The outer bread guard 420 includes a bottom member 423 that is positioned in the same way. A bottom bracket 426 is attached to the bottom of the front sub panels 316, 318 to secure each of the members 422, 423 in the corresponding hook 324, 325 as shown, and thereby secure the bread guards 418, 420 in place.

A center heating element 412 is positioned between the heating elements 402 and 404, and includes a pair of terminals 414 that extend through an aperture in the rear panel 306. The rear end of the center heating element 412 is attached to the rear panel 306 through the upper rear tab 326 and lower rear tab 328, as will be described in more detail below. Two inner bread guards 434 and 436 are positioned on respective sides of the center heating element 412. Each of the inner bread guards 434 and 436 is attached at its rear end through a corresponding tab on the rear panel 306, and is attached at its front end through a corresponding tab on a carriage support bracket 438 positioned between the front sub panels 316 and 318. The carriage support bracket 438 has a hole 439 adapted to receive a vertical rod (not shown). A bread carriage (not shown) slides along the vertical rod to raise and lower bread supports in the toaster 400, as will be understood by those skilled in the art. Although not shown in FIG. 3, the front end of the center heating element 412 is supported through respective tabs formed on the insides of the bottom bracket 426 and carriage support bracket 438.

In the toaster 400, a first bread cavity 440 is defined between the bread guards 418 and 434, and a second bread cavity 442 is defined between the bread guards 420 and 436. A first bread tray (not shown) is contained within the first bread cavity 440 and functions to support a piece of bread as it is lowered into and raised from the bread cavity 440. A second bread tray (not shown) is similarly positioned within the second bread cavity 442 to support another piece of bread in the bread cavity 442. Each of the bread carriages includes a lever 444 extending through slots 446 and 448, respectively, formed between the carriage support bracket 438 and the sub panels 316 and 318, respectively. The toaster 400 further includes an electronic circuit 428 mounted on the horizontal portion of the bottom bracket 426. Although not shown in FIG. 3, the electronic circuit 428 is coupled to the terminals 406–411 and 414 of the heating elements 402, 404, and 412, and operates to control the toaster 400 during operation. The specific operation of the electronic circuit 428 and overall operation of the toaster 400 will be well understood by those skilled in the art, and thus for the sake of brevity will not be described in more detail. An example of circuitry that may be utilized to form the electronic circuit 428 is described in U.S. patent application No. 09/307,074 to Lile, filed on May 7, 1999, which is incorporated herein by reference.

Figure 4:
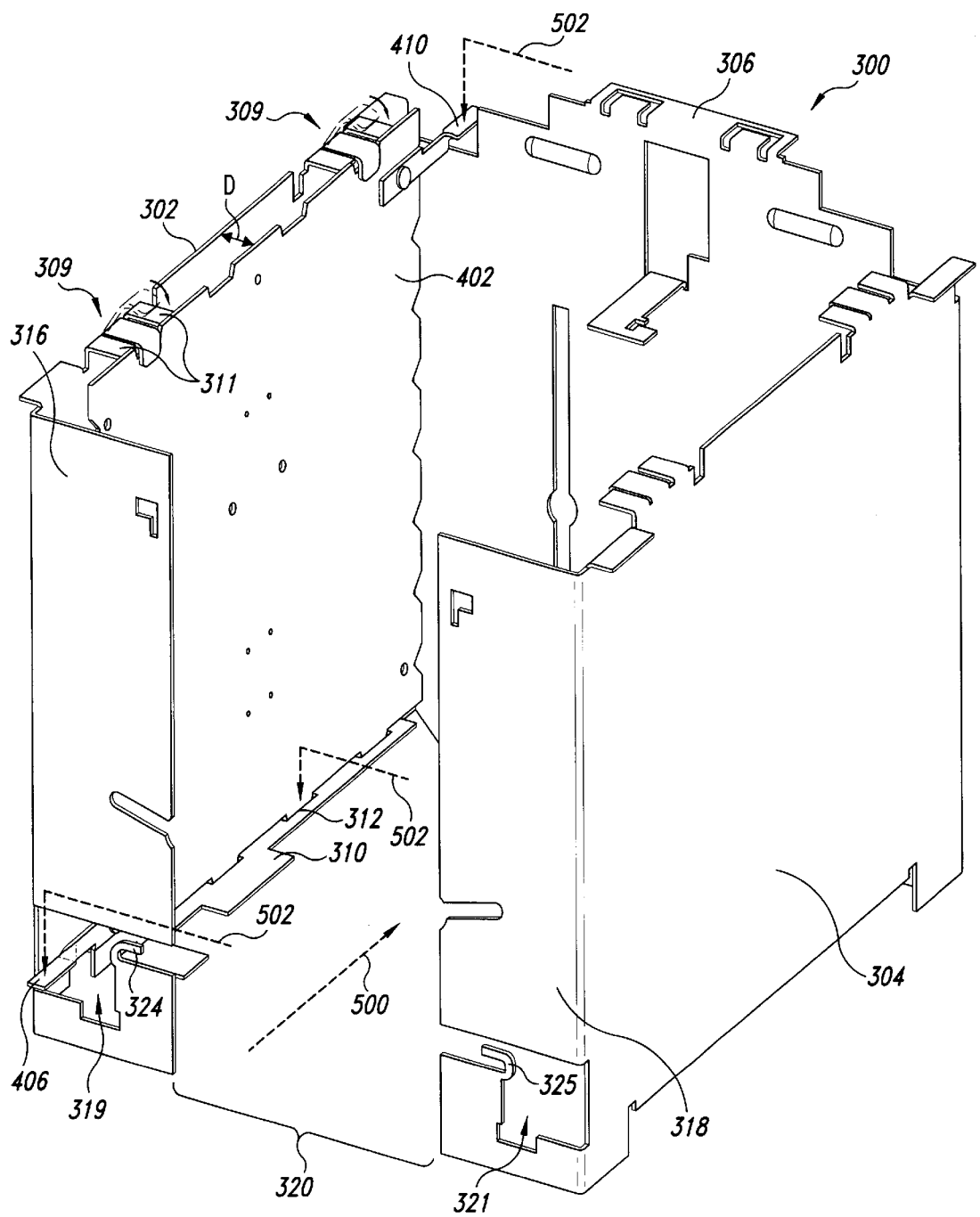
FIG. 4 is an isometric view of the toaster shell of FIG. 2 showing installation of an outer heating element according to one embodiment of the present invention.
Figure 5:
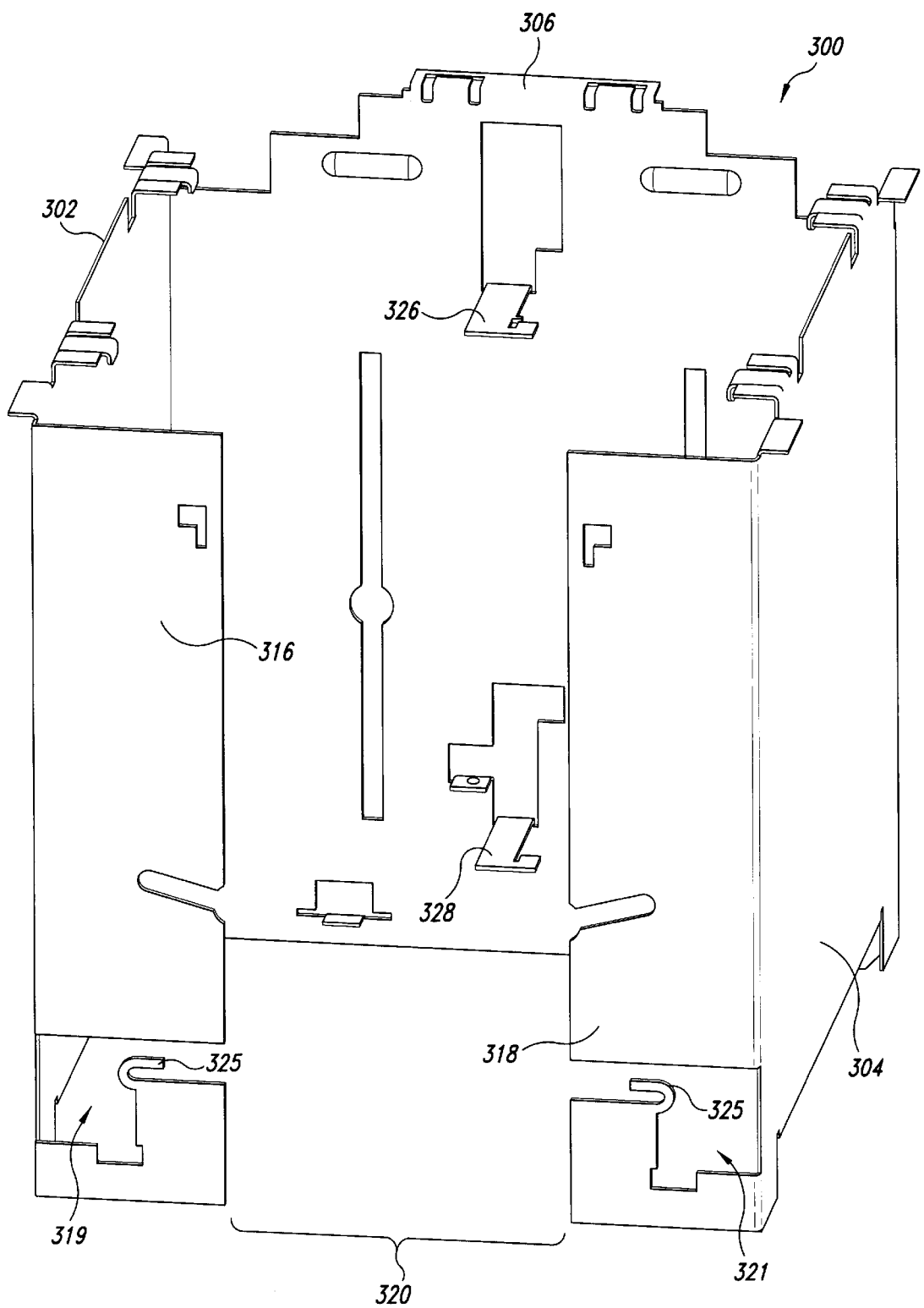
FIG. 5 is an isometric view of the toaster shell of FIG. 2 showing upper and lower mounting tabs for installation of a center heating element according to one embodiment of the present invention.
Figure 6:
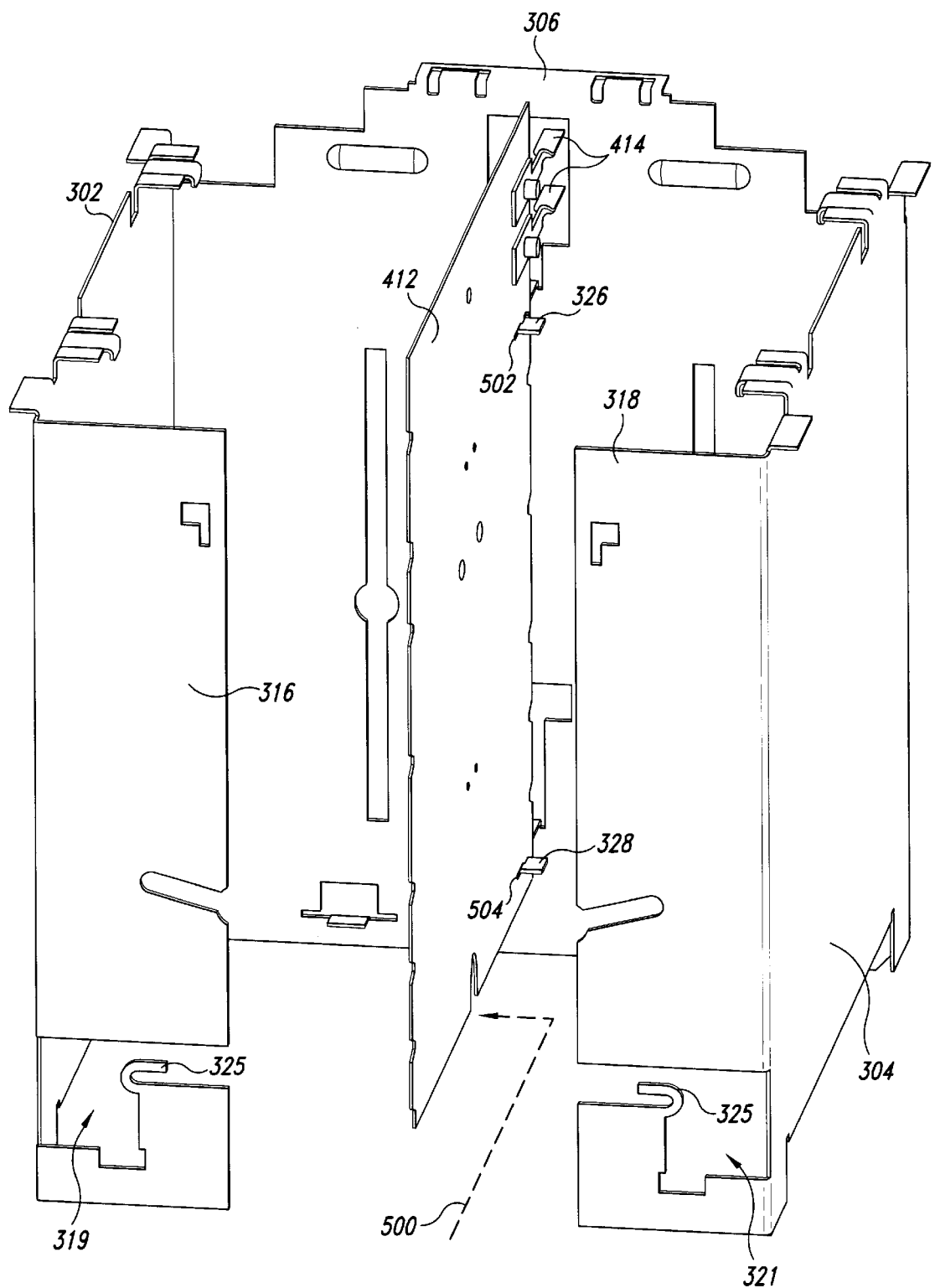
FIG. 6 is an isometric view of the toaster shell of FIG. 5 showing installation of the center heating element according to one embodiment of the present invention.

FIGS. 4–6 illustrate various isometric views of the shell 300 and will be used in describing the process of attaching the heating elements 402, 404, and 412 to the shell 300. FIG. 4 illustrates the insertion and attachment of the outer heating element 402 to the side panel 302. Before the outer heating element 402 is attached to the side panel 302, the upper side tabs 309 are in a substantially vertical position as indicated by the dotted lines in FIG. 4. To attach the outer heating element 402 to the side panel 302, the heating element 402 is first inserted along a path indicated by the dotted arrow 500 through the opening 320 and towards the rear panel 306. When being inserted through the opening 320 along the path 500, the heating element 402 is vertically positioned so that the terminal 410 is above the top edge of the rear panel 306 and the terminal 406 is just below the top edge of the aperture 319. Once the heating element 402 has been moved towards the rear panel 306 so that its front edge is inside the front sub panel 316, the heating element 402 is moved perpendicular to the surface of the side panel 302 as indicated by the arrows 502. The heating element 402 is moved toward the side panel 302 until the plurality of tabs along the bottom edge of the heating element are in position over corresponding slots 312 in the horizontal panel 310. When the tabs of the heating element 402 are over the corresponding slots 312, the heating element 402 is thereafter lowered to insert each of the tabs in a corresponding slot 312 as indicated by the arrows 502. After the heating element 402 has been lowered, the upper side tabs 309 are thereafter bent as indicated by the arrows to thereby secure the heating element 402 in place. As seen in FIG. 4, the tabs 309 secure the top of the element 402 against the spacers 311, and in this way the element 402 is secured substantially parallel to the panel 302 at a distance D from the panel.

The insertion and attachment of the outer heating element 404 to the side panel 304 is analogous to that previously described for the heating element 402, and thus for the sake of brevity will not be described in further detail. After the heating elements 402 and 404 are attached to the side panels 302 and 304, respectively, the outer bread guards 418 and 420 may similarly be inserted through the opening 420 and placed in position adjacent to the corresponding heating element 402, 404. It should be noted, however, that before attaching the bottom bracket 426 (FIG. 3) to the sub panels 316 and 318, the front ends of the bottom members 422, 423 of the outer bread guards 418, 420 are merely placed inside the corresponding hooks 324, 325, and not until the bottom bracket 426 is attached to the sub panels 316 and 318 are the front ends of the outer bread guards 418, 420 secured in place.

FIG. 5 is an isometric view of the shell 300 illustrating in more detail the upper rear tab 326 and lower rear tab 328 for attaching the rear end of the center heating element 412. Two rear tabs 326, 328 are shown in FIG. 5, but the precise number of rear tabs may be varied. FIG. 6 illustrates the process of attaching the center heating element 412 to the rear tabs 326, 328. To attach the center heating element 412, the center heating element is first moved towards the rear panel 306 as indicated by the arrow 500. The center heating element 412 is moved towards the rear panel 306 until respective slots 502 and 504 in the element are in line with the tabs 326 and 328, respectively. The center heating element 412 is thereafter moved towards the side panel 302 as indicated by the dotted arrow 500 to thereby insert the tabs 326 and 328 through the slots 502 and 504, respectively. The portions of the tabs 326 and 328 extending through the heating element 430 are thereafter deformed, such as by twisting, to secure the heating element 412 to the rear panel 306. The electric terminals 414 extend through the aperture in the rear panel 306 once the heating element is attached to the rear panel. Once the center heating element 430 has been attached to the tabs 326 and 328, the bottom bracket 426 (FIG. 3) is attached to the sub panels 316 and 318 as shown in FIG. 3. The carriage support bracket 438 is thereafter attached to the sub panels 316 and 318, and the inner bread guards 434 and 436 attached to the carriage support bracket 438 and rear panel 306 as previously described with reference to FIG. 3. The bread trays (not shown) may be inserted through the horizontal portions of the slots 446, 448 (see FIG. 3) after the bracket 438 is attached. As will be understood by those skilled in the art, the point during manufacture at which the bread trays are inserted may be varied.

Figure 7:
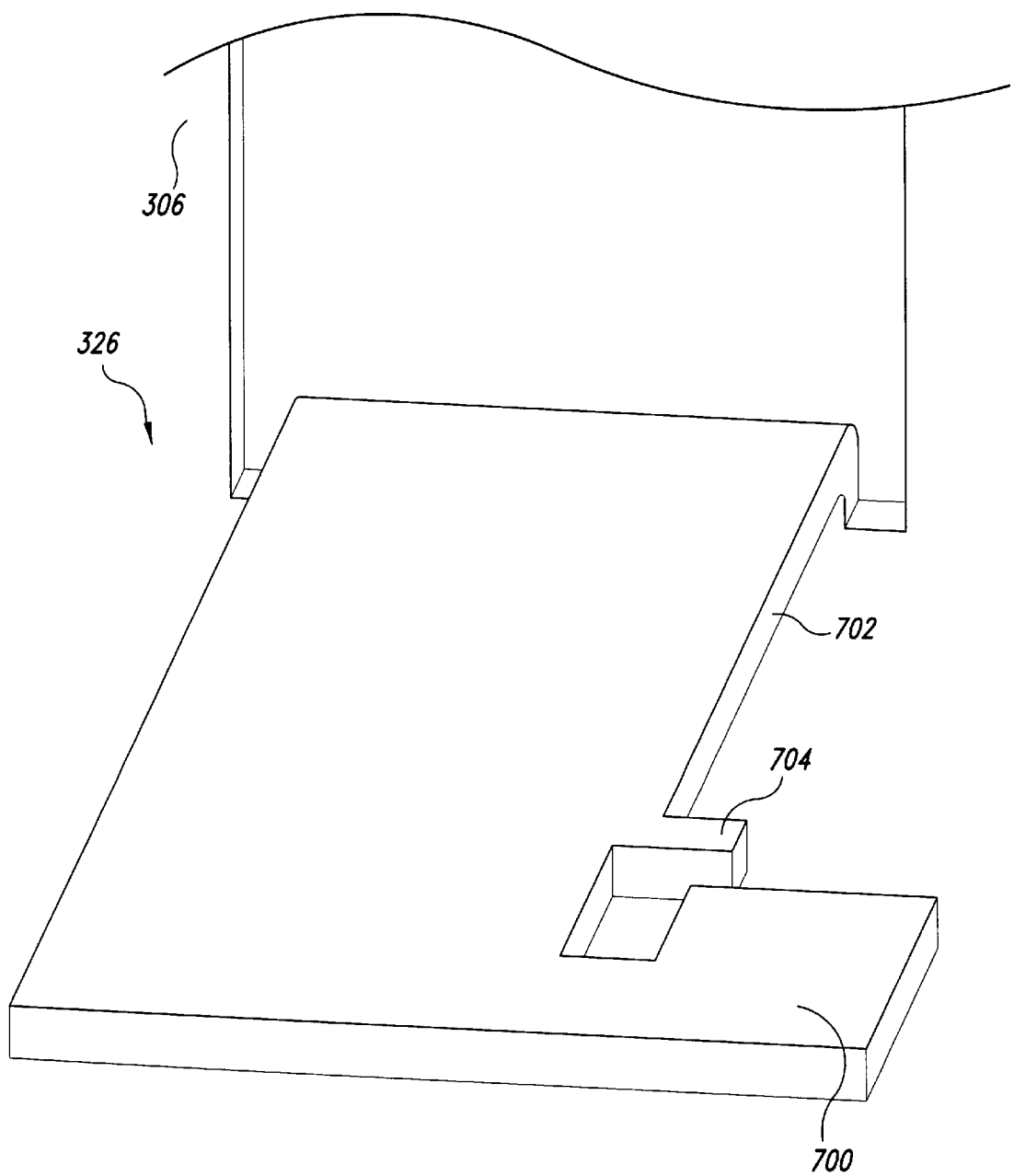
FIG. 7 is an exploded isometric view of the upper rear tab of FIG. 5.
Figure 8:
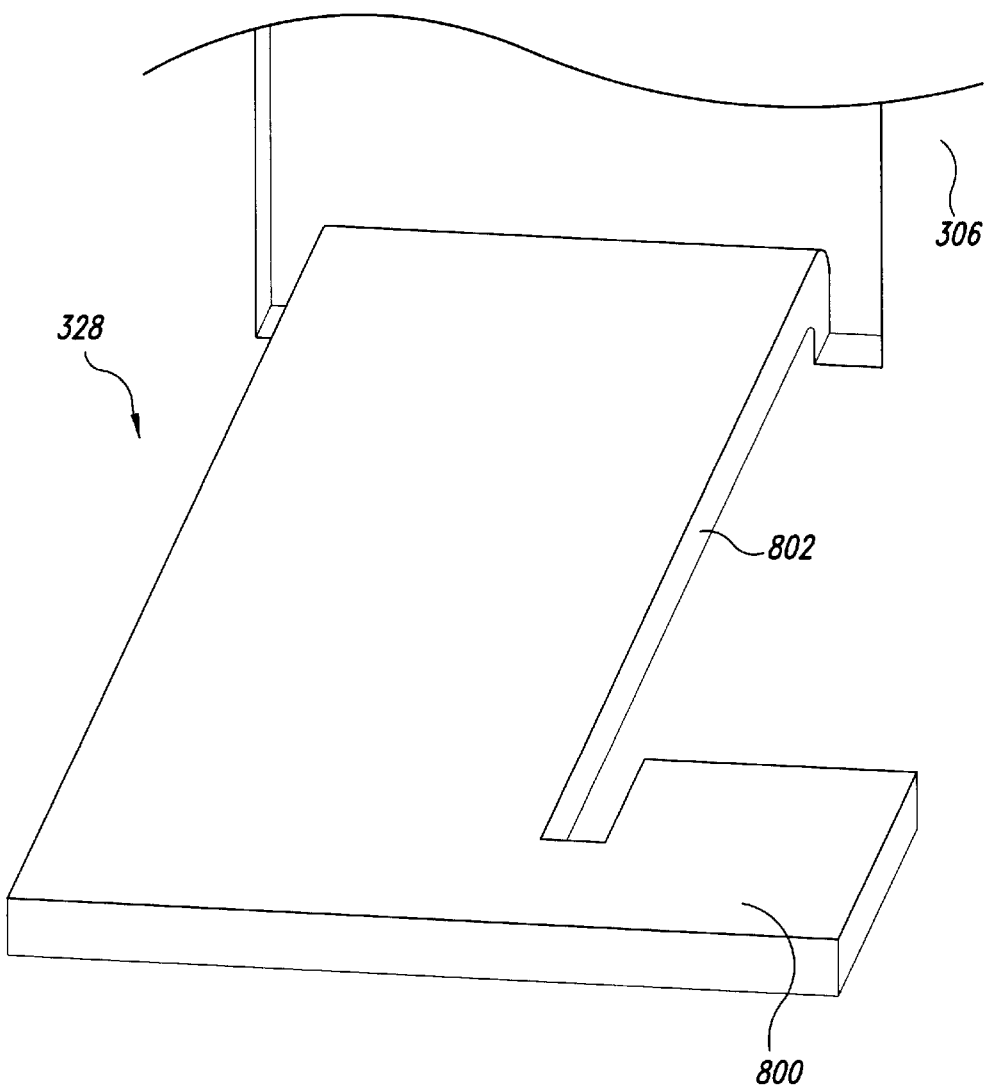
FIG. 8 is an exploded isometric view of the lower rear tab of FIG. 5.

FIG. 7 is an exploded isometric view of the upper rear tab 326 according to one embodiment of the present invention. The upper rear tab 326 includes a projection 700 that extends through the center heating element 412 (not shown) when that heating element is in place against a receiving side 702 of the tab 326. A guide projection 704 also extends through a corresponding hole in the center heating element 412 when the heating element is in place against the receiving edge 702, and functions to ensure that the heating element 412 is in the proper vertical position. The projection 700 is deformed once the center heating element 430 is in place against the receiving edge 702 to thereby secure the center heating element to the tab 326. FIG. 8 similarly is an exploded isometric view of the lower rear tab 328 according to one embodiment of the present invention. The tab 328 includes a projection 800 that extends through the corresponding slot in the heating element 412 (not shown) when the heating element is in place against a receiving edge 802 of the tab 328. As previously described for the tab 326, the projection 800 is thereafter deformed to secure the heating element 412 to the tab 328.

The shell 300 enables the insertion of the heating elements 402, 404, and 412 to be automated, reducing the cost and improving the reliability of the toaster 400. The insertion of these components through automation is possible due to the opening 320 that allows the components to be moved inside the shell 300 and then into position. As previously described, each of the heating elements 402, 404, and 412 includes terminals that must extend through the sides of the shell to provide electrical coupling between components outside the shell and the heating elements. The same is true of the outer bread guards 418 and 420, which may be inserted through the opening 320 and into place using automation. Furthermore, it should be noted that in the toaster 400, a space D (see FIG. 4) exists between the side panels 302, 304 and the heating elements 402, 404, respectively. These spaces, along with side panels 302 and 304, provide insulation for heat generated by the heating elements 402, 404 and thereby provide cool touch sides for the toaster 400 without further manufacturing operations. More specifically, even where a metal or plastic case is placed over the shell 300, the combination of the space between each of the side panels 302, 304 and the corresponding heating element 402, 404 provides sufficient insulation that the sides of the case remain cool even during option of the toaster 400.

It is to be understood that although various embodiments of the present invention have been set forth in the foregoing description, the above disclosure is illustrative only, and changes may be made in detail while remaining within the broad principles of the invention. For example, the number of side tabs 309 one each side panel 302, 304 of the shell 300 may be varied, as may the particular shape and size of the apertures 319, 321 as well as the shape and size of the opening 320. Accordingly, the invention is to be limited only by the appended claims.

What is claimed is:

1. A shell for a heating appliance comprising first and second side panels and front and rear end panels, the front end panel having first and second sub panels and each sub panel having a vertical edge, the vertical edges of the first and second sub panels being spaced apart to form an opening between the vertical edges that allows the insertion of components through the opening during assembly of the heating appliance, and each sub panel including an aperture extending to the corresponding vertical edge, the aperture being adapted to receive a portion of one of the components that extends beyond an outer surface of the sub panel.

2. The shell of claim 1 wherein each of the side panels comprises:

at least one tab positioned at a top edge of the side panel, each tab being formed in an initial position and adapted to being bent to a final position to secure a corresponding heating element; and a horizontal panel formed at a bottom edge of the side panel, the horizontal panel including at least one slot adapted to receive a tab from the corresponding heating element.

3. The shell of claim 2 wherein each tab at the top edge and each slot in the horizontal panel are adapted to secure the corresponding heating element at a distance from an inside surface of the side panel to thereby provide a space between a surface of the heating element and the inside surface of the side panel.

4. The shell of claim 1 wherein each of the sub panels has a height H and the opening extends the entire height H of the sub panels.

5. The shell of claim 1 wherein the aperture of each sub panel comprises a horizontal slot adapted to receive a terminal from a corresponding heating element.

6. The shell of claim 1 wherein the rear end panel further comprises at least one mounting tab adapted to receive a center heating element.

7. The shell of claim 1 wherein the heating appliance comprises a toaster.

8. The shell of claim 1 wherein the side panels, rear panels and front sub panels of the shell are unitary.

9. The shell of claim 1 wherein each side panel comprises a mounting panel integrally formed at a bottom edge of the side panel, the mounting panel adapted to receive a portion of one of the components.

10. An assembly for a heating appliance, comprising:

a shell for a heating appliance comprising first and second side panels and front and rear end panels, the front end panel having first and second sub panels and each sub panel having a vertical edge, the vertical edges of the first and second sub panels being spaced apart to form an opening, and each sub panel including an aperture extending to the corresponding vertical edge;

a first side heating element attached on the inside of the first side panel and including a terminal extending through the aperture in the first sub panel, the first side heating element operable responsive to a power signal being applied on the terminal to generate heat;

a second side heating element attached on the inside of the second side panel and including a terminal extending through the aperture in the second sub panel, the second side heating element operable responsive to a power signal being applied on the terminal to generate heat; and a center heating element attached to the rear end panel between the first and second side heat elements, the center heating element including a terminal extending through an aperture in the rear panel and operable responsive to a power signal being applied on the terminal to generate heat.

11. The assembly of claim 10, further comprising first and second outer bread guards attached to the front and rear end panels adjacent the first and second side heating elements, respectively.

12. The assembly of claim 10 wherein the center heating element is attached to the rear end panel approximately equidistant from the first and second side heating elements.

13. The assembly of claim 10 wherein each of the side panels comprises:

at least one tab positioned at a top edge of the side panel, each tab being formed in an initial position and adapted to being bent to a final position to secure the corresponding side heating element; and a horizontal panel formed at a bottom edge of the side panel, the horizontal panel including at least one slot adapted to receive a tab from the corresponding side heating element.

14. The assembly of claim 13 wherein each tab at the top edge and each slot in the horizontal panel are adapted to secure the corresponding heating element at a distance from an inside surface of the side panel to thereby provide a space between a surface of the heating element and the inside surface of the side panel.

15. The assembly of claim 10 wherein each of the sub panels has a height H, and the vertical edge of each sub panel extends the entire height H of the sub panel.

16. The assembly of claim 10 wherein each aperture comprises a horizontal slot adapted to receive the terminal from the corresponding side heating element and the sub panel includes a hook portion extending into the horizontal slot, the hook portion being adapted to receive a portion of the corresponding outer bread guard.

17. The assembly of claim 10 wherein the heating appliance comprises a toaster.

18. A heating appliance, comprising:

a shell having first and second side panels and first and second end panels, and the first end panel having first and second sub panels, each sub panel having a vertical edge and the vertical edges of the first and second sub panels being spaced apart to form an opening between the vertical edges, the first end panel allowing the insertion of components through the opening during assembly of the heating appliance;

a first heating element attached on the inside of the first side panel and a second heating element attached on the inside of the second side panel, each heating element including at least one terminal adapted to receive a power signal and operable responsive to the power signal being applied to generate heat; and an electronic circuit coupled to the terminals of the heating elements, the electronic circuit operable to apply the power signals to the heating elements during a heating cycle of the appliance and to remove the power signal to terminate the heating cycle.

19. The heating appliance of claim 18, further comprising a third heating element being attached to the second end panel between the first and second heating elements.

20. The heating appliance of claim 19 wherein the third heating element is attached approximately equidistant from the first and second heating elements.

21. The heating appliance of claim 18 wherein each of the side panels comprises:

at least one tab positioned at a top edge of the side panel, each tab being formed in an initial position and adapted to being bent to a final position to secure the corresponding heating element; and a horizontal panel formed at a bottom edge of the side panel, the horizontal panel including at least one slot adapted to receive a tab from the corresponding heating element.

22. The heating appliance of claim 21 wherein each tab at the top edge and each slot in the horizontal panel are adapted to secure the corresponding heating element at a distance from an inside surface of the side panel to thereby provide a space between a surface of the heating element and the inside surface of the side panel.

23. The heating appliance of claim 18 wherein each of the sub panels has a height H, and the vertical edge of each sub panel extends the entire height H of the sub panel.

24. The heating appliance of claim 18 wherein each of sub panels further comprises a horizontal slot adapted to receive a terminal from a corresponding heating element.

25. The heating appliance of claim 18 wherein the heating appliance comprises a toaster.

26. A method of manufacturing an assembly for a toaster, comprising:

providing a shell having first and second side panels, a rear end panel, and a front end panel, the front end panel having an opening;

inserting a first outer heating element through the opening;

attaching the first outer heating element to the first side panel;

inserting a second outer heating element through the opening;

attaching the second outer heating element to the second side panel;

inserting a center heating element through the opening; and attaching the center heating element to the rear end panel.

27. The method of claim 26 wherein inserting each of the first and second outer heating elements comprises:

moving the heating element through the opening and towards the second end panel at an angle substantially parallel to inner surfaces of the first and second side panels until an end of the heating element is adjacent the rear end panel; and moving the outer heating element towards the corresponding side panel at an angle substantially perpendicular to the inner surface of that panel.

28. The method of claim 26 wherein each of the first and second side panels includes at least one tab positioned at a top edge of the side panel and a horizontal panel positioned at the bottom of the side panel and including at least one slot adapted to receive a tab from the corresponding heating element, and wherein attaching each of the first and second outer heating elements comprises inserting tabs on the heating element into corresponding slots on the horizontal panel and thereafter bending each of the tabs to secure the heating element adjacent the corresponding side panel.

29. A method of manufacturing an assembly for a toaster, comprising:

providing a shell having first and second side panels and first and second end panels, the first end panel having an opening;

inserting a first outer heating element through the opening and attaching the first outer heating element to the first side panel;

inserting a second outer heating element through the opening and attaching the second outer heating element to the second side panel;

inserting a first outer bread guard through the opening and positioning the first outer bread guard adjacent the first outer heating element;

inserting a second outer bread guard through the opening and positioning the second outer bread guard adjacent the second outer heating element;

inserting a center heating element through the opening and attaching the center heating element to the second end panel;

attaching a bottom bracket to the first end panel and thereby securing the outer bread guards to the shell;

attaching a carriage support bracket to the first end panel to cover the opening; and inserting first and second center bread guards adjacent respective sides of the center heating element, the center bread guards being inserted through the top of the shell; and inserting first and second bread trays adjacent the first and second after bread guards, respectively.

30. The method of claim 29 wherein inserting each of the first and second outer heating elements comprises:

moving the heating element through the opening and towards the second end panel at an angle substantially parallel to inner surfaces of the first and second side panels until an end of the heating element is adjacent the second end panel; and moving the outer heating element towards the corresponding side panel at an angle substantially perpendicular to the inner surface of that panel.

31. The method of claim 29 wherein each of the first and second side panels includes at least one tab positioned at a top edge of the side panel and a horizontal panel positioned at the bottom of the side panel and including at least one slot adapted to receive a tab from the corresponding heating element, and wherein attaching each of the first and second outer heating elements comprises inserting tabs on the heating element into corresponding slots on the horizontal panel and bending each of the tabs to secure the heating element adjacent the corresponding side panel.

32. The method of claim 29 wherein inserting a center heating element through the opening comprises:

moving the center heating element through the opening and towards the second end panel at an angle substantially perpendicular to an inner surface of the second end panel; and moving the center heating element at an angle substantially parallel to the inner surface of the second end panel until the center heating element engages tabs formed on the second end panel.

33. The method of claim 32 wherein attaching the center heating element to the second end panel comprises twisting each of the tabs to secure the center heating element to the second end panel.

34. The method of claim 29, further comprising inserting bread supports into a bread cavity defined within. the shell.

35. The method of claim 29 wherein inserting the first and second bread trays occurs after attaching the carriage support bracket.

36. A unitary shell structure for a heating appliance comprising first and second side panels, a rear end panel, and first and second front end panels, all of the panels being integrally formed from a single piece of material, and each of the first and second front end panels having a vertical edge, the vertical edges of the first and second front end panels being spaced apart to form an opening between the vertical edges that allows the insertion of components through the opening during assembly of the heating appliance, and each of the first and second front end panels including an aperture extending to the corresponding vertical edge, the aperture being adapted to receive a portion of one of the components that extends beyond an outer surface of the front end panel.

37. The unitary shell structure of claim 36 wherein each of the side panels comprises:

at least one tab positioned at a top edge of the side panel, each tab being formed in an initial position and adapted to being bent to a final position to secure a corresponding heating element; and a horizontal panel formed at a bottom edge of the side panel, the horizontal panel including at least one slot adapted to receive a tab from the corresponding heating element.

38. The unitary shell structure of claim 36 wherein each tab at the top edge and each slot in the horizontal panel are adapted to secure the corresponding heating element at a distance from an inside surface of the side panel to thereby provide a space between a surface of the heating element and the inside surface of the side panel.

39. The unitary shell structure of claim 36 wherein each of the first and second front end panels has a height H and the opening extends the entire height H of the front end panels.

40. The unitary shell structure of claim 36 wherein the aperture of each front end panel comprises a horizontal slot adapted to receive a terminal from a corresponding heating element.

41. The unitary shell structure of claim 36 wherein the rear end panel further comprises at least one mounting tab adapted to receive a center heating element.

42. The unitary shell structure of claim 36 wherein the heating appliance comprises a toaster.

43. The unitary shell structure of claim 36 wherein the shell structure comprises metal.

44. A shell for a heating appliance comprising first and second side panels and front and rear end panels, the front end panel having first and second sub panels and each sub panel having a vertical edge, the vertical edges of the first and second sub panels being spaced apart to form an opening between the vertical edges that allows the insertion of components through the opening during assembly of the heating appliance, and each sub panel including an aperture extending to the corresponding vertical edge, the aperture being adapted to receive a portion of one of the components that extends beyond an outer surface of the sub panel, and each side panel including a mounting panel formed at a bottom edge of the side panel, each mounting panel being adapted to receive a corresponding component.

45. The shell of claim 44 wherein the mounting panel of each side panel comprises a plurality of slots, each slot being adapted to receive a tab from a corresponding heating element.

46. The shell of claim 44 wherein each of the side panels comprises at least one tab positioned at a top edge of the side panel, each tab being formed in an initial position and adapted to being bent to a final position to secure a corresponding heating element.

47. The shell of claim 44 wherein each of the sub panels has a height H and the opening extends the entire height H of the sub panels.

48. The shell of claim 44 wherein the aperture of each sub panel comprises a horizontal slot adapted to receive a terminal from a corresponding heating element.

49. The shell of claim 44 wherein the rear end panel further comprises at least one mounting tab adapted to receive a center heating element.

50. The shell of claim 44 wherein the heating appliance comprises a toaster.

51. The shell of claim 44 wherein the side panels, rear panels and front sub panels of the shell are unitary.

* * * * *